United States Patent
Wang et al.

(10) Patent No.: US 10,097,397 B2
(45) Date of Patent: Oct. 9, 2018

(54) SYSTEM AND METHOD FOR MANAGING CWSN WITH GUI

(71) Applicant: GTI INTERNATIONAL SEMICONDUCTOR TECHNOLOGY CO., LTD., Beijing (CN)

(72) Inventors: Yu Wang, Beijing (CN); Yuan Liao, Beijing (CN); Haibo Lu, Beijing (CN)

(73) Assignee: GTI International Semiconductor Technology Co., Ltd., Beijing (CN)

( * ) Notice: Subject to any disclaimer, the term of this patent is extended or adjusted under 35 U.S.C. 154(b) by 914 days.

(21) Appl. No.: 14/649,519

(22) PCT Filed: Jul. 30, 2013

(86) PCT No.: PCT/CN2013/080379
§ 371 (c)(1),
(2) Date: Jun. 3, 2015

(87) PCT Pub. No.: WO2014/023172
PCT Pub. Date: Feb. 13, 2014

(65) Prior Publication Data
US 2018/0069745 A1 Mar. 8, 2018

(30) Foreign Application Priority Data
Aug. 7, 2012 (CN) .......................... 2012 1 0279260

(51) Int. Cl.
*H04L 29/08* (2006.01)
*H04W 24/04* (2009.01)
(Continued)

(52) U.S. Cl.
CPC ........ *H04L 29/08567* (2013.01); *H04L 41/22* (2013.01); *H04W 24/04* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2002/0050932 A1 | 5/2002 | Rhoades et al. |
| 2008/0007396 A1 | 1/2008 | Parkulo et al. |
| 2009/0092113 A1 | 4/2009 | Doshi et al. |

FOREIGN PATENT DOCUMENTS

| | | |
|---|---|---|
| CN | 101232417 | 7/2008 |
| CN | 202218272 | 5/2012 |

(Continued)

OTHER PUBLICATIONS

European Search Report dated Aug. 4, 2016 for European Application No. 13828601.

(Continued)

*Primary Examiner* — Angela Nguyen
(74) *Attorney, Agent, or Firm* — Beyer Law Group LLP

(57) ABSTRACT

A system and method for managing CWSN with GUI are disclosed. The system comprises a cloud server to managing sensor data and operation status of a wireless sensor network. The system also comprises a client communicating with the cloud server to generate a dynamic user interface mainly in graphics for monitoring and instruction exchange. It can make the information of the wireless sensor network easy to access for users and provide more convenient control and maintenance of the wireless sensor network.

11 Claims, 14 Drawing Sheets

(51) Int. Cl.
     *H04W 84/18*   (2009.01)
     *H04L 12/24*   (2006.01)

(56)            References Cited

FOREIGN PATENT DOCUMENTS

| CN | 202261821   | 5/2012  |
| CN | 202353825   | 7/2012  |
| CN | 102821414   | 12/2012 |
| CN | 202598679   | 12/2012 |
| CN | 202599445   | 12/2012 |
| CN | 202600947   | 12/2012 |
| CN | 202602911   | 12/2012 |
| CN | 102883311   | 1/2013  |
| CN | 102510334   | 2/2014  |
| CN | 103763328   | 4/2014  |
| CN | 104348921   | 2/2015  |
| CN | 102665297   | 3/2015  |
| CN | 204215211   | 3/2015  |
| CN | 104539653   | 4/2015  |
| WO | 2008/153275 | 12/2008 |

OTHER PUBLICATIONS

International Search Report dated Oct. 31, 2013 from International Application No. PCT/CN2013/080379.
Written Opinion dated Feb. 10, 2015 from International Application No. PCT/CN2013/080379.

```
digraph cwsn_fig4 {
    Node [shape=circle]; n0; n1; n2; n3; n4; n5; n6; n7;
    n0 -> n1;
    n0 -> n2;
    n1 -> n3;
    n1 -> n4;
    n2 -> n5;
    n2 -> n6;
    n4 -> n7;
}
```

FIG. 7

| next wireless device ID |
|---|
| first wireless device ID |
| second wireless device ID |
| ● |
| ● |
| last wireless device ID |
| termination symbol |
| data package type |
| content data |

FIG. 11

```
<wireless device list>

00, base station 01, relay 02, relay 03, node, battery=low 04, relay 05, node 06, node 07, node, fault code=2

<\wireless device list>
```

FIG. 12

<edge list>

(00, 01, 6)

(00, 02, 5)

(01, 03, 4)

(01, 04, 9)

(02, 05, 0)

(02, 06, 5)

(04, 07, 2)

<\edge list>

FIG. 13

<edge list>

(00, 01, 6)

(00, 02, 5)

(01, 03, 4)

(02, 04, 3)

(02, 05, 0)

(02, 06, 5)

(04, 07, 2)

<\edge list>

FIG. 14

SYSTEM AND METHOD FOR MANAGING CWSN WITH GUI

CLAIM OF PRIORITY AND CROSS-REFERENCE TO RELATED APPLICATION(S)

This application is a national stage application under 35 U.S.C. 371 of International Application No. PCT/CN2013/080379, filed Jul. 30, 2013 (published as WO2014/023172A1). The International Application claims priority to Chinese Patent Application No. 20121079260.8, filed on Aug. 7, 2012. The afore-mentioned patent applications are hereby incorporated by reference in their entireties.

BACKGROUND OF THE INVENTION

1. Field of the Invention

The present disclosure relates to the technical field of wireless sensor network and cloud computing, in particular to a system and method for managing CWSN (Cloud Wireless Sensor Network) communication data based on GUI (graphical user interface).

2. Description of the Related Art

Wireless sensor network is a wireless network with the main aim of information collection. A plurality of wireless devices (such as wireless sensors, Zigbee sensors, etc.) are included in the wireless sensor network and transmit the collected information to a data center through wireless communication protocol (also known as wireless communication method).

In general, the wireless devices in the wireless sensor network are divided into three categories in accordance with their functions: node and relay, base station and data center. The node is mainly configured for information collection and transmitting the collected information to the base station wirelessly. Sometimes the node needs to transmit the information to the base station through multi-hop, thus it needs wireless device to function as relay in the wireless sensor network. The base station is mainly configured for receiving the information from the node and the relay and sending the information to the data center in a wireless or wire way. The definition of node, relay and base station is not strict. For example, the node may have the function of the relay and the relay or the base station may have the function of the node.

When the number of the wireless devices in the wireless sensor network is relatively large, the control and maintenance of the network becomes a problem. The existing wireless network generally informs the system administrator of the operation condition of the network in the form of text. The system administrator needs to examine a plurality of text files, datasheets and so on. Due to this reason, it needs professional company or team to maintain the networks, and it is difficult for the users to control and maintain the network by themselves.

BRIEF DESCRIPTION OF THE INVENTION

In view of this, one of the objects of the present disclosure is to provide a system and method for managing CWSN with GUI.

In accordance with one aspect of the present disclosure, there is provided a system for managing CWSN with GUI, wherein the system comprises: one or more wireless sensor networks, each comprising at least one wireless device, wherein the wireless device comprises at least one base station, at least one node and/or at least one relay, and is configured to collect sensor data and transmit the sensor data and operation status of wireless devices to a cloud server; one or more cloud server configured to receive the sensor data and operation status from the base station, to process the sensor data and storing the sensor data in a database, to manage the operation of the wireless device in the wireless sensor network and to store a wireless device list and a communication connection list representing the communication connection between each pair of father node and child node in the wireless sensor network; wherein the cloud server is configured to transmit the wireless device list and the communication connection list to a client and to forward data packages from the client to the wireless device; and one or more clients configured to display the wireless device list and the communication connection list with a dynamic graphic interface and to convert instructions into data of the wireless device list and the communication connection list and transmit it to the cloud server; wherein the dynamic graphic interface comprises the name of each wireless device in the wireless device list and network topology of the wireless devices; wherein width or length or color of a connecting line in the network topology varies with RSSI of corresponding connection in the communication connection list.

Preferably, the operation status comprises the status of the battery, the status of the communication connection, RSSI and the operation status of the sensor.

Preferably, the node and the relay both comprise: a sensor module comprising a sensor device for collecting sensor data; a RF communication module comprising a RF communication chip for wirelessly communicating with each other when adopting a same physical layer communication protocol; and a signal processing module configured to control the sensor module by requesting or modifying its operation status through serial port, to request and receive the sensor data from the sensor module, to process the sensor data, and to control the RF communication module to receive or transmit data package wirelessly and to request and modify operation status of the RF communication module.

Preferably, the node and the relay further comprise: a memory for performing signal processing and computing; a mass storage device for storing the sensor data and operating information including the communication protocol information; and a power supply module comprising a battery and a battery power managing chip and/or a DC power supply import and a DC power managing chip.

Preferably, the base station comprises: a base station sensor module comprising a sensor device for collecting the sensor data; an Ethernet communication module comprising an Ethernet communication chip and an Ethernet interface, for communicating with devices in Ethernet via Ethernet standard communication protocols; and a base station signal processing module configured to control the base station sensor module by requesting or modifying its operation status through serial port, to request and receive the sensor data from the base station sensor module, to process the sensor data, and to control the Ethernet communication module to exchange data packages with the cloud server.

Preferably, the base station further comprises: a memory for performing signal processing and computing; a mass storage device for storing the sensor data and operating information including communications protocol information; and a power supply module comprising a battery and a battery power managing chip and/or a DC power supply import and a DC power managing chip.

Preferably, each time receiving a data package transmitted from the base station, the cloud server updates the wireless device list and the communication connection list in accordance with the data package.

Preferably, the client is configured to marks "x" on corresponding wireless device to indicate that the commination path of the child node is closed if RSSI is too low for reliable communication, and to display the characteristics of the wireless device in the wireless device list beside corresponding icon of the wireless device.

In accordance with another aspect of the present disclosure, there is provided a method for managing CWSN with GUI, which comprising: S100, collecting sensor data and packaging the sensor data and operation status of a node or relay into a data package and transmitting the same to a base station; S200, a base station forwarding the data package received from the node or relay to a cloud server via Ethernet for further processing, wherein the cloud server is configured to store a wireless device list and a communication connection list representing the communication connection between each pair of father node and child node in the wireless sensor network, and to transmit the wireless device list and the communication connection list to a client; and S300, the client displaying the wireless device list and communication connection list in accordance with data packages obtained from the cloud server, and controlling and modifying operation status of wireless sensor network in accordance with instructions.

Wherein, controlling and modifying operation status of wireless sensor network in accordance with instructions further comprises: S310, an image generation module transmitting the instructions to an interface management module; S320, the interface management module converting the instructions into a data compatible with the wireless device list and/or the communication connection list and then transmitting the data to the cloud server; S330, a communication management module in the cloud server parsing the received data, generating a data package in accordance with the data and transmitting the data package to related wireless device; S340, after the communication management module receiving an acknowledgment package from the wireless device, updating the wireless device list and/or the communication connection list in accordance with the acknowledge package and transmitting updated information to all interface management modules, the interface management module updating wireless device list and/or communication connection list on the client and transmitting the updated information to the image generation module; and S350, the image generation module updating an interface graphics program and thus updating image display.

Preferably, the step S200 further comprises: S210, the cloud server transmitting to the base station a data package including a communication path via the Ethernet when the cloud server needs to communicate with a wireless device, and then the base station forwarding the data package.

Preferably, in the step S310, the instruction is one or more of instructions for adding node, modifying a communication connection, removing a communication connection, deleting a wireless device and modifying parameters of a wireless device.

The present disclosure can make the information of the wireless sensor network easy to access for users and provide more convenient control and maintenance of the wireless sensor network.

BRIEF DESCRIPTION OF THE DRAWINGS

FIG. 7 is an embodiment for implementing the wireless network topology in FIG. 4 by using "graphviz" program;

FIG. 11 is a schematic diagram of the format of the data package transmitted from the cloud server to the based station;

FIG. 12 is a schematic diagram of the wireless device list in accordance with the embodiments of the present disclosure;

FIG. 13 is a schematic diagram of the "edge" list in accordance with the embodiments of the present disclosure; and FIG. 14 is a schematic diagram of the "edge" list modified by the communication path in the embodiments of the present disclosure.

DETAILED DESCRIPTION OF EMBODIMENTS OF THE INVENTION

In order to make the object, the technical solution and the advantage of the present disclosure to be clearer, the implementations of the system and method for managing CWSN (Cloud Wireless Sensor Network) communication data with GUI (graphical user interface) in accordance the present disclosure are further described as below in details with the drawings. It should be understood that the embodiments as recited herein are only for interpreting the present disclosure and do not intend to make any limitations thereto.

The system for managing CWSN (Cloud Wireless Sensor Network) communication data based on GUI (graphical user interface) in accordance with an embodiment of the present disclosure comprises one or more wireless sensor networks, one or more cloud servers and client software modules.

Figure 1:
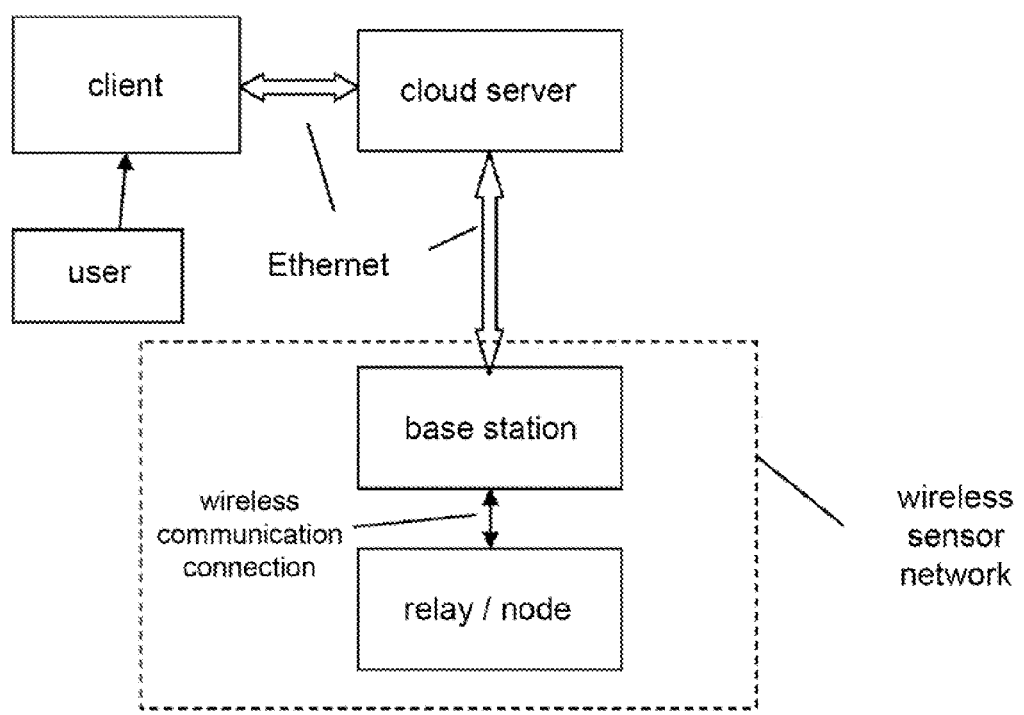
FIG. 1 is a schematic diagram of the system for managing CWSN (Cloud Wireless Sensor Network) communication data based on GUI.

FIG. 1 is a schematic diagram of the system for managing CWSN (Cloud Wireless Sensor Network) communication data based on GUI (graphical user interface) in accordance with an embodiment of the present disclosure, the system comprising:

1) A wireless sensor network which comprises at least one wireless device. The wireless device comprises at least one base station, at least one node and/or at least one relay. The wireless sensor network is configured to collect sensor data and to transmit the sensor data and the operation status of the device to the cloud server.

The sensor data collected by the node or the relay is transmitted to the base station via wireless communication protocols and is forwarded to the cloud server by the base station via an Ethernet.

The node and the relay also transmit their own operation status to the base station in addition to the sensor data and the base station forwards the same to the cloud server.

The operation status includes the status of the battery, the status of the communication connections, the received signal strength, the operation status of the sensor and so on.

The signal processing module of the node and the relay acquires the status information of the battery through the battery module, acquires the status of the communication path and the strength information of the received signal through the RF communication module and acquires the operation information of the sensor through the sensor module.

2) The cloud server is configured for receiving the sensor data and the operation status of the wireless sensor network from the base station in the wireless sensor network, processing the sensor data and storing the sensor data in a database, managing the operation of the wireless sensor network, managing the operation of the base station, the relay and the node in the wireless sensor network and supporting and controlling the client software module.

3) The client software module is configured to display the operation status of sensor network, to control and modify the operation status of the sensor network.

The operation status of the sensor network is transmitted to the client software module via the Ethernet by the cloud server, and the client software module may transmit the operation instruction of a user to the cloud server via the Ethernet. The cloud server may support one or more client software modules at the same time.

The user comprises the administrator of the wireless network and the client with authority. The user may manage and control the wireless network through the client software module.

Figure 2:
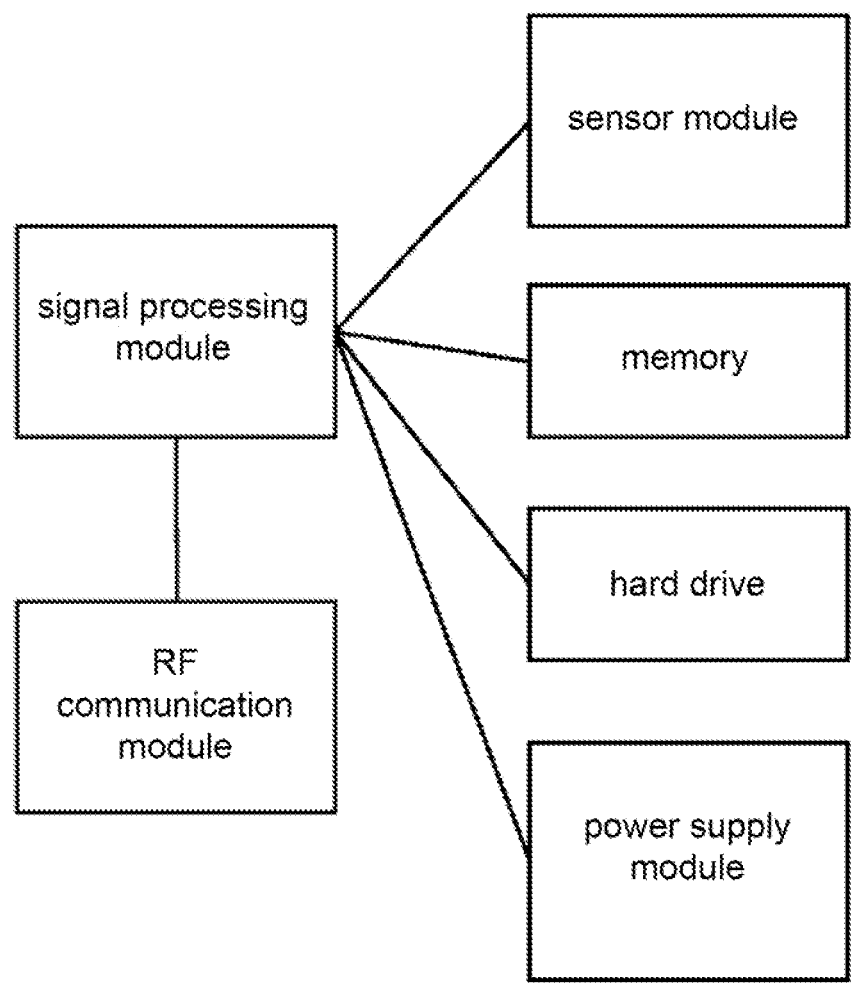
FIG. 2 is a schematic diagram of the structure of the node and the relay.

FIG. 2 is a schematic diagram of the structure of the node and the relay. The structure of the node and that of the relay is the same with the difference in that the node may be used for collecting the sensor data while the relay may be used as relay. In the present system, the relay can be used for collecting the sensor data.

The node and relay both comprise a signal processing module, a sensor module and a radio frequency (RF) communication module. The core of the node and relay is the signal processing module.

The hardware of the signal processing module is a signal processing device such as a microcontroller unit (MCU) or a central processing unit (CPU).

1) The signal processing module is used for controlling the sensor module through a serial port such as I2C, SPI or UART and for requesting sensor data from the sensor module, receiving the sensor data and processing the sensor data.

The signal processing module is also configured to obtain operation status of the sensor module and to modify the operation status of the sensor through the serial port.

The sensor module comprises a sensor device for collecting sensor data such as temperature, humidity and carbon monoxide.

2) The signal processing module is also configured to control the RF communication module through a serial port such as I2C, SPI or UART and to wirelessly receive or transmit data package through the RF communication module.

The signal processing module can also obtain operation status of the RF communication module and can also modify the operation status of the RF communication module through the serial port.

The RF communication module comprises RF communication chip, the RF communication chip may wirelessly communicate with each other when adopting the same physical layer communication protocol.

The signal processing module may modify the physical layer communication protocol through the serial port.

Further, the node and the relay further comprise a memory such as RAM and ROM for performing signal processing and computing.

The node and the relay further comprise a mass storage device such as a flash memory (FLASH) or any other type of disk for storing the sensor data and operating information of the device which includes the communication protocol information.

The node and the relay further comprise a power supply module. The power module comprises a battery and a battery power management chip and/or comprises a DC power supply import (such as 5V or 12 V) and a DC power management chip.

Figure 3:
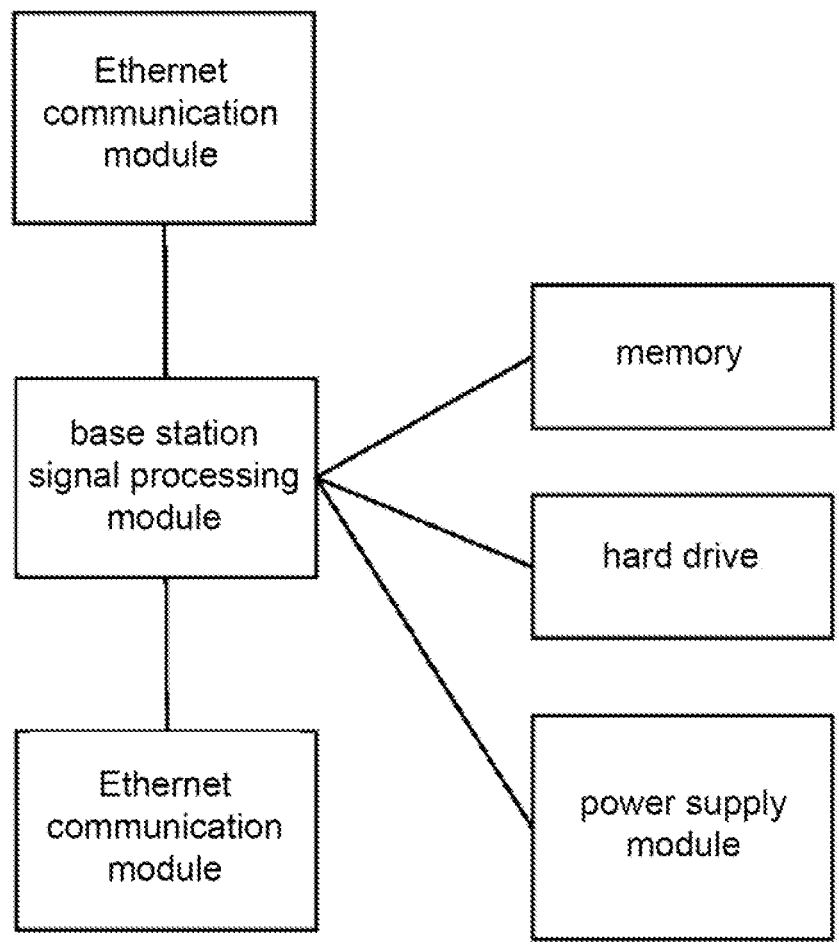
FIG. 3 is a schematic diagram of the structure of the base station.

FIG. 3 is a schematic diagram of the structure of the base station. The base station comprises a base station signal processing module, a base station sensor module and an Ethernet communication module. The core of the base station is the base signal processing module.

The hardware of the signal processing module is a signal processing device such as a microcontroller unit (MCU) or a central processing unit (CPU).

1) The base station signal processing module is configured for controlling the sensor module/the base station sensor module through serial port such as I2C, SPI or UART and for requesting sensor data from the sensor module/the base station sensor module, receiving the sensor data and processing the sensor data.

The base station signal processing module can also obtain operation status of the sensor module/the base station sensor module and modify the operation status of the sensor module/the base station sensor module through the serial port.

The sensor module/the base station sensor module comprise a sensor device for collecting sensor data such as temperature, humidity and carbon monoxide.

2) The base station signal processing module is configured for controlling the Ethernet communication module through a serial port such as I2C, SPI or UART and may transmit/receive data package to/from the cloud server through the Ethernet communication module.

The Ethernet communication module comprises an Ethernet communication chip and an Ethernet interface for communicating with the devices including but not limited to the cloud server in the Ethernet via Ethernet standard communication protocol.

Further, the base station comprises a memory such as RAM and ROM for performing signal processing and computing.

The base station further comprises a mass storage device such as a flash memory (FLASH) or any other type of disk for storing the sensor data and operating information of the device which includes the communications protocol information.

The base station further comprises a power supply module. The power module comprises a battery and a battery power management chip and/or comprises a DC power supply import (such as 5V or 12 V) and a DC power management chip.

Figure 4:
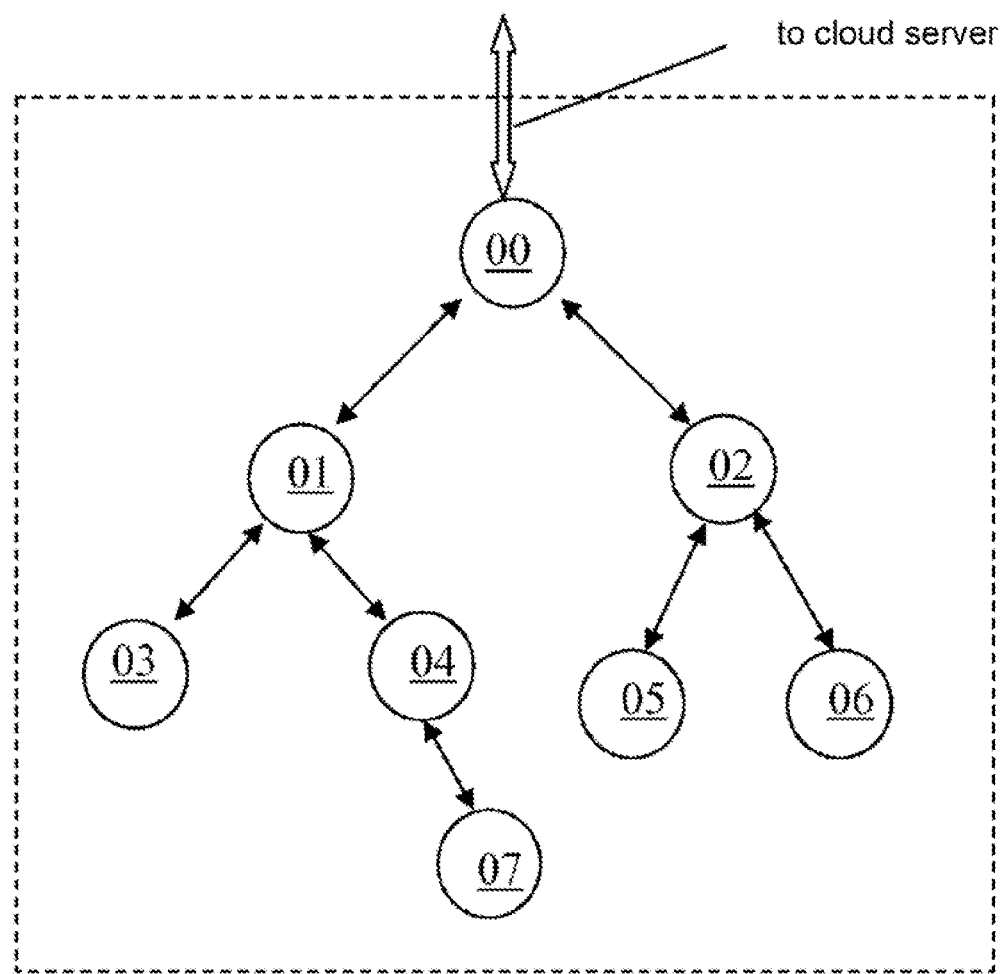
FIG. 4 is a schematic diagram of the topology of the wireless sensor network.

FIG. 4 is a schematic diagram of the network topology of the wireless sensor network. In the schematic diagram, each circle represents a wireless device and each wireless device has a unique ID number. The lines with arrows represent the communication connections between the wireless devices.

As shown in FIG. 4, the wireless sensor network comprises a base station (00) and a plurality of nodes and relays (01 to 07). Only the base station can communicate with the cloud server via the Ethernet communication module while all wireless devices wirelessly communicate with each other through the RF communication module. In the network, each node or relay has a communication path to the base station. For example, the node 07 is connected with the base station 00 through the relay 04 and 01. The node 07 is a child node of the relay 04, while the relay 04 is a father node of the node 07. The communication connections between the nodes and the relays are stored in the mass storage devices thereof and can be modified by the signal processing module/the base station signal processing module.

Figure 5:
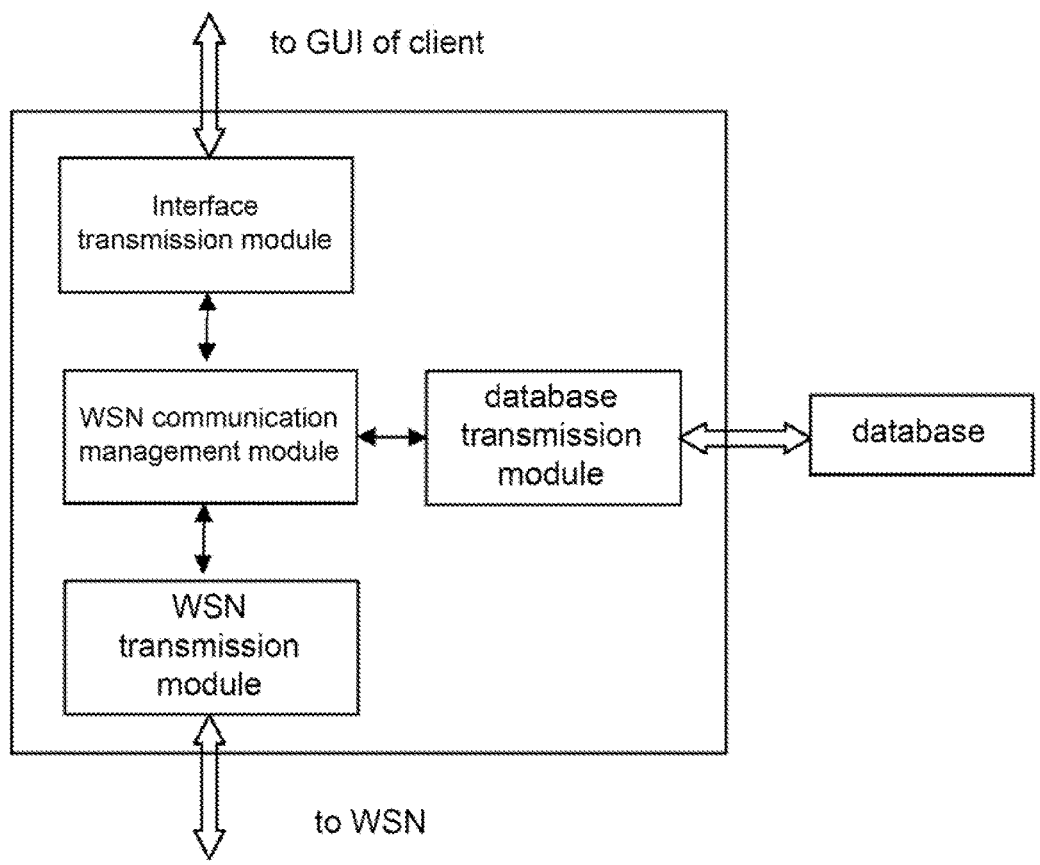
FIG. 5 is a schematic diagram of the structure of the cloud server in accordance with the embodiments of the present disclosure.

FIG. 5 is a schematic diagram of the structure of the cloud server in the present disclosure. The cloud server comprises a WSN communication management module, a WSN transmission module, a database, a database transmission module and an interface transmission module, wherein:

The WSN communication management module (referred as the communication management module) is the core of the cloud server and is used for processing and storing sensor data, managing the operation of the sensor network and managing the client interface.

Figure 9:
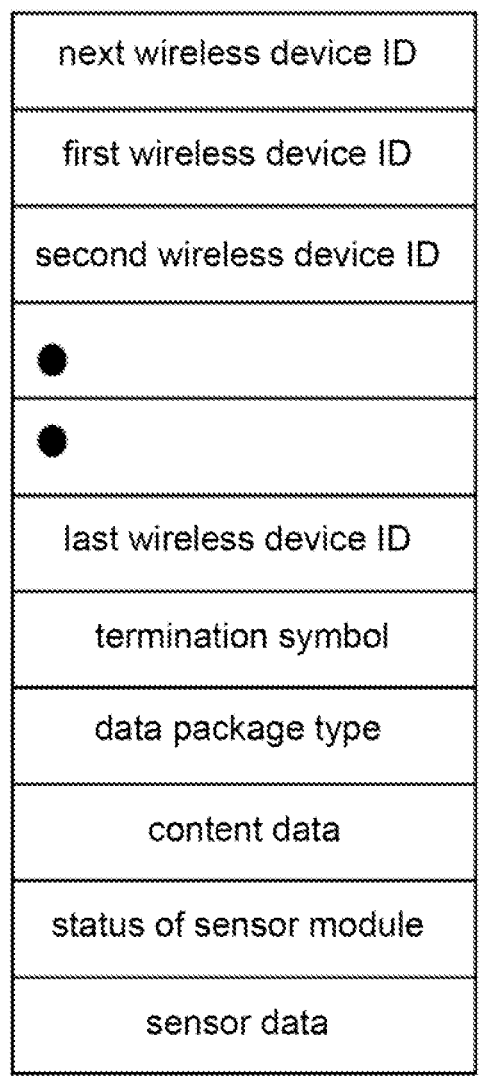
FIG. 9 is a schematic diagram of the format of the data package transmitted from the node or the relay to the based station.

The first primary function of the communication management module is to process and store the sensor data. After the communication management module receiving the data package transmitted by the base station (FIG. 9 shows the format of the data package) through the WSN transmission module, the communication management module parses out "the first wireless device ID" and "sensor information" and transmits the same to the database through the database transmission module if "data package type" in the data package equals to 0.

The second function of the communication management module is to manage the operation of the sensor network. The wireless device list is stored in the memory of the communication management module and the format of the data in the list is "wireless device ID, wireless device type, wireless device feature 1, wireless device feature 2, . . . ". The wireless device features include the status of the battery, the status of the wireless device, the status of the sensor, channel number, transmission speed, transmission power and so on. The communication management module has stored default wireless device features, thus the wireless device list does not need to include the default feature. For example, the wireless device in FIG. 4 can be described with the wireless device list in FIG. 12.

A communication connection (referred as "edge") of each pair of father node and child node is also stored in the memory of the communication management module. The expression of "edge" is "(father node ID, child node ID, RSSI)". RSSI is "received signal strength indication (RSSI)" in the data package in FIG. 9 and is updated each time a data package is received. For example, the wireless network in FIG. 4 can be described with the "edge" list in FIG. 13. In FIG. 13, RSSI is represented by 0-9 with 0 representing the weakest received signal and 9 representing the strongest received signal.

The communication management module performs the management of the wireless sensor network by using the wireless device lists and the "edge" list (communication connection list). The communication management module may find a communication path from any first wireless device to any second wireless device. Each time the communication management module receives a data package from the base station, the communication management module updates the wireless device list and the "edge" list in accordance with the content of the data package.

The communication management module may store the wireless device lists and the "edge" list in the database. Each time the wireless device lists and the "edge" list are updated, the communication management module transmits the updated lists to the database.

The database is configured to store the sensor data.

The WSN transmission module is used for the communication between the communication management module and the base station in the wireless sensor network and for exchanging data packages between the communication management module and base station via Ethernet TCP/IP communication protocol.

The database transmission module is used for the communication between the communication management module and the database and for exchanging data packages between the communication management module and database via Ethernet TCP/IP communication protocol.

The interface transmission module is used for the communication between the communication management module and the client software module and for exchanging data packages from the communication management module and the client software module via Ethernet TCP/IP communication protocol.

The third function of the communication management module is to manage the client interface. The client software module displays the network topology of the wireless sensor network on a display with dynamic graphics and allows a user to modify the communication connections and parameters of the wireless sensor network through the interface. The basis by which the communication management module and the client software module communicate with each other is the wireless device list and the "edge" list. After the wireless device list or the "edge" list is updated (in accordance with the data package from the base station), the communication management module transmits the updated content to all client software modules. When a user modifies any parameter of the wireless sensor network through the client software module, the client software module transmits the modified information to the communication management module.

Figure 6:
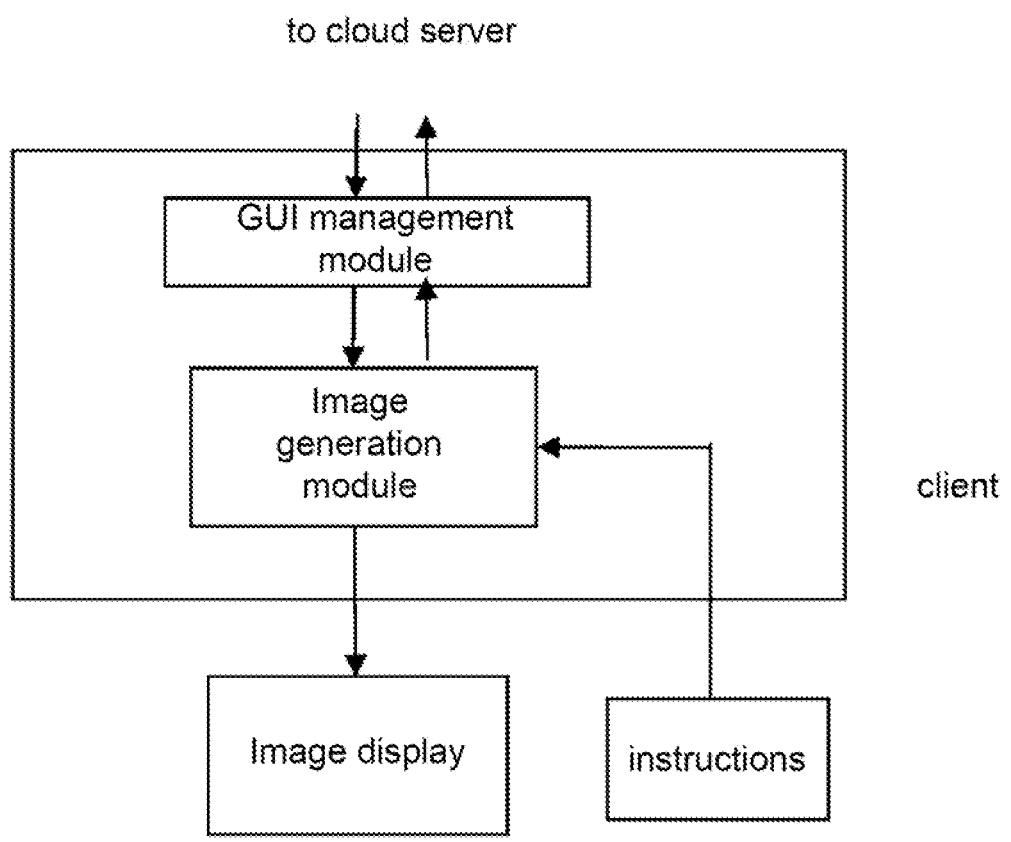
FIG. 6 is a schematic diagram of the structure of the client software module.

FIG. 6 is a schematic diagram of the structure of the client software module. The interface transmission module in the cloud server in FIG. 5 is used for the communication between the client software module and the cloud server and for exchanging data packages between the client software module and the cloud server by using Ethernet TCP/IP communication protocol.

The client software module parses the data package transmitted from the cloud server, manages and updates the wireless device list and the "edge" list and displays the same. When the user performs operation in the interface, the client software module can convert the operation instruction into data compatible with the wireless device list and the "edge" list and then transmits the data to the cloud server through the cloud server transmission module.

The client software module comprises an image generation module and an interface management module.

The image generation module is configured to display the network topology of the wireless sensor network on a display with dynamic graphics. The implementing method is to convert the wireless device list and the "edge" list into a format acceptable to the drawing program. The present disclosure does not limit the use of certain drawing program and many drawing program can achieve the function of displaying the dynamic graphic interface as long as there is provided the wireless device list and the "edge" list. For example, the "graphviz" program in FIG. 7 can achieve the wireless network topology diagram of FIG. 4.

The interface management module is configured to parse the data package from the cloud server, to manage and update the wireless device list and the "edge" list, to convert the operation instruction into data compatible the wireless device list and the "edge" list after the user performing operation in the interface and then transmit the data to the cloud server.

When the wireless device list and the "edge" list are updated, the image generation module updates the drawing program and thus the graphics of the interface is updated according to the change in the state of the network, and thus achieving a dynamic interface.

Figure 8:
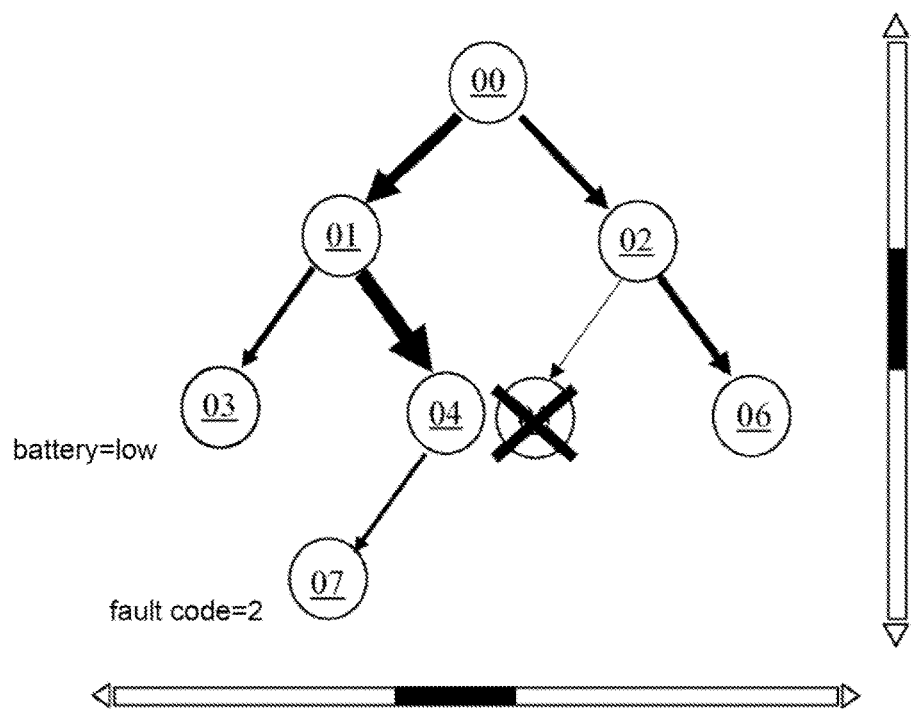
FIG. 8 is a schematic diagram of the dynamic interface in accordance with the embodiments of the present disclosure.

The program in FIG. 7 is a relatively simple instant and the dynamic interface of the present disclosure may be incorporated more functions with more complicated codes, but the principle is the same. For example, FIG. 8 is a screenshot which is the dynamic interface of the present disclosure. The interface in FIG. 8 also represents the structure of the sensor network shown in FIG. 4 and the dynamic graphics interface includes:

1. name of each wireless device in the wireless device list;
2. connection between the wireless devices (namely, the "edge" list);
3. the width of the lines representing the RSSI in the "edge" list, which is achieved by using the "width" function in the drawing program. Of course, RSSI can also be achieved by the length of the connection ("len"), or by the color of the connection ("color");
4. if RSSI=0, then marking "x" on the child node which indicates that the commination connection with the child node is unreliable;
5. the features of the wireless devices in the wireless device list displaying beside the wireless device such as "battery=low" and "fault code=2" shown in FIG. 12.

The user can easily know real-time operation status of the network and the occurred problems by operation of the client software module. Thus the dynamic interface allows the user to perform real-time maintenance of the network.

Based on the same inventive concept, the embodiment of the present disclosure further provides a method for managing CWSN with GUI, comprising following steps:

S100, collecting sensor data and packaging the sensor data and operation status of a node or relay into a data package and transmitting the same to the base station;

FIG. 9 is a schematic diagram of the format of the data package transmitted to the based station from the node and the relay. A first portion of the data package is the communication path and includes following contents:

1. "next wireless device ID": the ID of the next wireless device to process the data package;
2. "first wireless device ID": the ID of the wireless device at the start point of the communication path;
3. "second wireless device ID": the ID of the first relay in the communication path;
4. " . . . ": the IDs of other relays in the communication path;
5. "last wireless device ID": the ID of the wireless device at the termination point of the data package;
6. "termination symbol": the symbol of the termination of the communication path.

The wireless device ahead of a particular wireless device in the communication path is a father node of said particular wireless device and the wireless device behind the particular wireless device is its child node. For example, the father node of the second wireless device is the first wireless device and the child node of the second wireless device is the third wireless device.

The data package further includes following contents if it is transmitted to the base station by the node or the relay:

1. "data package type" and "content data": the wireless device receiving the data package processes the data package in accordance with the data package type. The data package type includes but is not limited to:

| data package type | meaning of the type | content data |
|---|---|---|
| 0 | normal data package | received signal strength indication (RSSI) plus data |
| 1 | acknowledge package (acknowledge of receiving the data package) | received signal strength indication (RSSI) |
| 2 | task acknowledge package (acknowledge of performing the task) | 0: task finished 1: task failed |
| 3 | failing to contact with the child node (i.e. cannot receive the response package from the child node) | the ID of the child node and the times of trying to contact |
| 4 | low battery alarm | received signal strength indication (RSSI) |
| 5 | wireless device fault | 0-3 |
| 6 | reporting the hardware parameter | hardware parameter data |

In above table, the received signal strength indication (RSSI) is provided by the RF communication module. If the RSSI is too low, the error code rate of the data package will increase. Therefore the cloud sensor network uses the RSSI to measure the channel quality.

In the above table, when there is a fault in a wireless device, the value of the content data may be 0 (not serious), 1, 2 or 3 (serious) in accordance with the seriousness of the fault.

In above table, the hardware parameter data refers to predetermined hardware parameter of the signal processing module, the RF communication module and the power supply management module in the wireless device.

2. "status of the sensor module" and "sensor information": the status of the sensor module includes but is not limited to:

| status of the sensor module | meaning of the status | sensor information |
|---|---|---|
| 0 | sensor operates normally | sensor data |
| 2 | task acknowledge package | 0: task finished 1: task failed |
| 5 | sensor fault | 0-3 |
| 6 | reporting the hardware parameter | hardware parameter data |

In the above table, when there is a fault in the sensor module, the value of the sensor information may be 0 (not serious), 1, 2 or 3 (serious) in accordance with the seriousness of the fault.

In above table, the hardware parameter data refers to predetermined hardware parameter of the sensor module.

S200, the base station forwards the data package received from the node or the relay to the cloud server via the Ethernet. The data in the data package is processed by the cloud server.

In the present disclosure, the base station forwards the data package received from the node or the relay to the cloud server via the Ethernet, the data in the data package is processed by the cloud server. This method has an advantage of reducing the complication of the base station. The base station does not need to store the communication path, and the cloud server stores the communication path from the base station to each relay or node.

Figure 10:
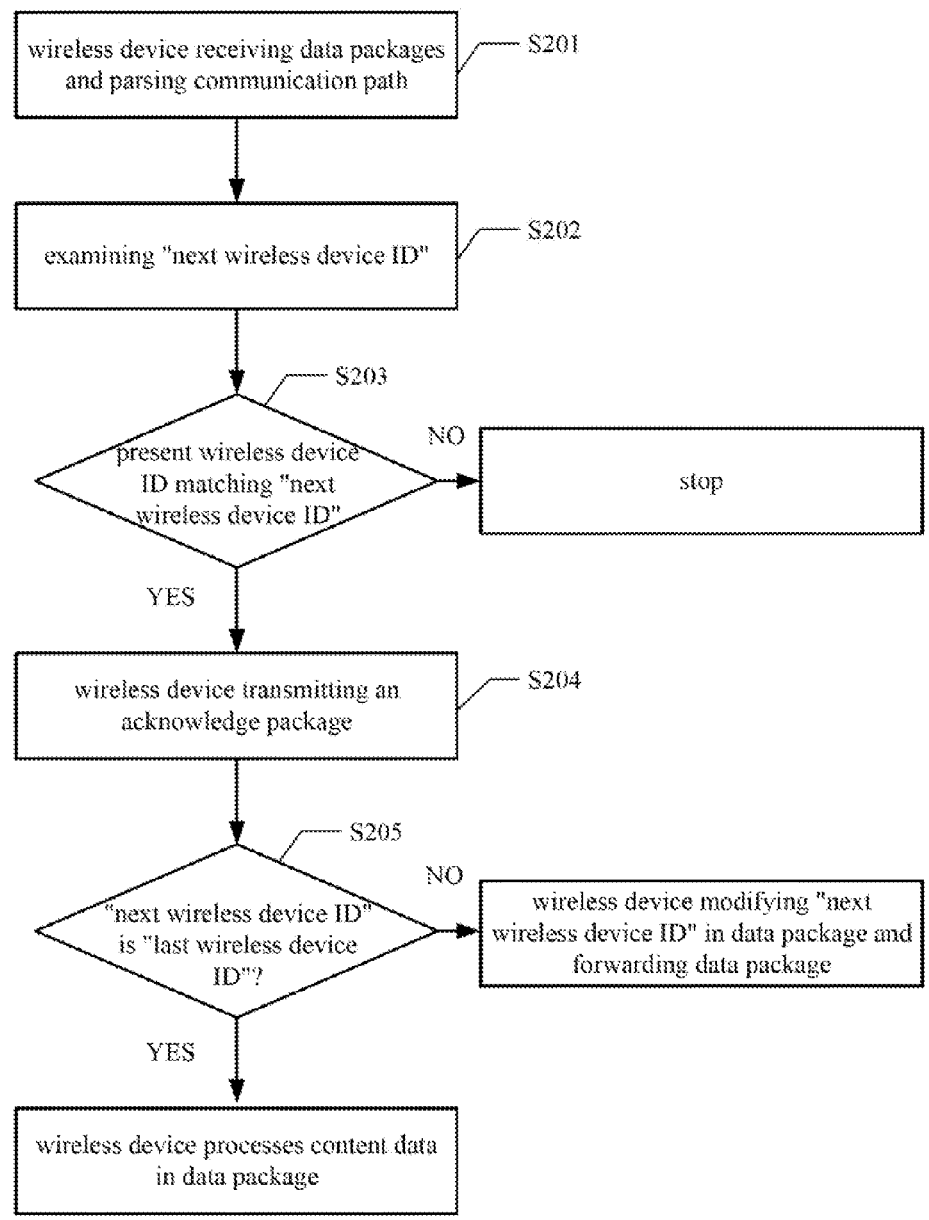
FIG. 10 is a flow chart showing an implemental way for processing the data in the data package in accordance with the embodiments of the present disclosure.

As illustrated in FIG. 10, the steps S100-S200 comprises following steps:

S201, the wireless device receives a data package and parses out the communication path therein.

Parsing the instruction belongs to prior art and thus will not be described in details in the embodiments of the preset disclosure.

S202, the wireless device looks for "next wireless device ID" in the communication path.

S203, the wireless device stops processing the communication path instruction if the ID of the wireless device itself is different from "next wireless device ID", and the method ends and returns.

S204, if the ID of the wireless device itself is identical with "next wireless device ID", then the wireless device is a relay or termination point in the communication path. The wireless device transmits an acknowledge package to its father node. The format of the acknowledge package is the same as that shown in FIG. 9 with following contents: "next wireless device ID"=father node ID, "first wireless device ID"=wireless device ID, "last wireless device ID"=father node ID and "data package type"=1.

S205, examining whether "next wireless device ID" is identical with "last wireless device ID". If no, then the wireless device identifies itself as a relay in this communication path. The wireless device updates "next wireless device ID" in the data package as the ID of its child node and then transmits the data package; if yes, the wireless device identifies itself as the termination point in the communication and the wireless device continue parsing the content in the data package.

The step S200 further comprises following step:

Step S210, when the cloud server needs to communicate with the wireless device, the cloud server transmits the data package including the communication path to the base station via the Ethernet, the base station then wirelessly transmits the data package.

FIG. 11 shows the format of the data package transmitted to the based station from the cloud server. The format of the data package is similar and compatible with that of the data package from the node or relay. The steps of processing the data package by the wireless device are the same as those shown in FIG. 10 and will not be repeated herein. Other content in the data package includes "data package type" and "content data". The wireless device receiving the data package processes the data package in accordance with the data package type. The data package type includes but is not limited to:

| data package type | meaning of the type | content data |
|---|---|---|
| 16 | request to transmit sensor data | 0 |
| 17 | request to transmit hardware parameter | hardware parameter code |
| 18 | request to modify hardware parameter | new hardware parameter |
| 19 | communication path update | 0 |

In above table, the hardware parameter code helps defining the hardware parameter to be transmitted. For example, "0" represents the parameter of the signal processing module, "1" represents the parameter of the RF communication module, "2" represents the parameter of the power supply management module and "3" represents the parameter of the sensor module.

In above table, if data package type is "19", it means the cloud server has updated the communication path, and the wireless device needs to write the communication path in the data package into the mass storage device to make an update. Then the wireless device transmit an acknowledge data package to the cloud server.

S300, displaying, controlling and modifying operation status of the sensor network, in accordance with the data in the data package of the wireless sensor network obtained from the cloud server.

In the embodiment of the present disclosure, controlling and modifying operation status of the sensor network particularly refers to setting and modifying the wireless device in the wireless network through a dynamic interface, and comprises following steps:

S310, the user input an operation instruction in the interface by using an input device such as a keyboard or a mouse to;

S320, an image generation module transmits the operating instruction to an interface management module;

S330, the interface management module converts the operation instruction into a data pattern in the wireless device list and/or the "edge" list and then transmits the data to the cloud server;

S340, a communication management module in the cloud server parses the received data, generates a data package in accordance with the content of the data and transmits the data package to related wireless device;

S350, after the communication management module receiving an acknowledgment data packet of the wireless device, updating the wireless device list and/or the "edge" list in accordance with the content of the acknowledge data package and transmitting the updated information to all interface management modules, the interface management module updates its own wireless device list and/or the "edge" list and transmits the updated information to the image generation module;

S360, the image generation module updates the interface graphics program and thus updates the image display.

Below is an elementary instant of a user setting. In this instant, a user adds a new node 08 to the network in FIG. 4 and designates its father mode as node 04 through the dynamic interface. The setting steps are as below:

1. The user clicks the right key of the mouse and selects "adding new wireless device". A new dialog box appears and the user can write the ID ("08") and feature ("node") of the new wireless device in the dialog box;

2. The image generation module transmits the instruction to the interface management module;

3. The interface management module transmits "08, node" (the content to be added in the wireless device list) and "(04, 08, N)" (the content to be added in the "edge" list, wherein N represents no RSSI information) to the cloud server;

4. The communication management module in the cloud server parses the received data package to obtain a communication path to the node 08 (namely, 00→01→04→08) and transmits the communication path update data package to the node 08 (data package type=19). If the communication management module receives the acknowledge data package (data package type=1) sent back from the node 08, the communication management module adds "08, node" in the wireless device list and adds "(04, 08, RSSI)" in the "edge" list, the value of RSSI is that in the acknowledge data package from the node 08. If the communication management module does not receive the acknowledge data package from the node 08, the communication management module receives a report (data package type=3) from the relay 04. The communication management module adds "08, node" in the wireless device list and adds "(04, 08, 0)" in the "edge" list. The communication management module in the cloud server transmits the updated content to all interface management modules;

5. The interface management module updates its own wireless device list and/or "edge" list and transmits the updated information to the image generation module;

6. The image generation module modifies the interface graphics program and then updates the image display. In the image display, the node 08 will appear and the thickness of the "edge" from the relay 04 to the node 08 represents the value of the RSSI.

In above instant, the user needs to place the node 08 at the desire place and turn on the node, otherwise the cloud server will not find the node 08 which causes the state of RSSI=0 in the "edge" list.

In addition to adding a wireless device, the interface software module further provides following functions. The particular implementing methods of these functions are similar to that of above instant, thus all details of the steps will not be repeated below.

1) Modifying the communication connection. In the dynamic interface, a user uses the left key of the mouse to drag a first wireless device which is already existed onto a second wireless device which is already existed, the effect thereof is the communication connection ("edge") of the first wireless device and its father node is cut off, and the father node of the first wireless device is changed to the second wireless device. For example, as shown in FIG. 8, dragging the relay 04 by using the left key of the mouse onto the relay 02 and then releasing the left key of the mouse, the father node of the relay 04 is changed from 01 to 02. The child nodes (namely, node 07) below the relay 04 remain unchanged. This function can be implemented by modifying the "edge" list. FIG. 14 shows a new "edge" list which deletes "(01, 04, 9)" and adds "(02, 04, 3)" as compared to the original "edge" list in FIG. 13, wherein RSSI=3 is the value in the acknowledge data package sent back from the relay 04.

2) Removing a communication path. A user uses the left key of the mouse to drag a wireless device to the edge of the interface, the connection ("edge") of this wireless device and its father node is cut off. The method of implementing this function is to modify the "edge" list. For example, the user selects to disconnect the node 05 shown in FIG. 8, the method for implementing this is to remove "(02, 05, 0)" from the "edge" list shown in FIG. 13. This method does not delete the node 05 from the interface.

3) Deleting a wireless device. A user clicks the right key of the mouse on a wireless device in the interface and selects "deleting wireless device". A new dialog box will appear and query whether the user affirms to delete this wireless device, and the users selects yes. The method of implementing this function is to modify the "edge" list and the wireless device list. For example, the user selects to delete the node 05 shown in FIG. 8, the method for implementing this is to remove "(02, 05, 0)" from the "edge" list shown in FIG. 13 and to remove "05, node" from the wireless device list shown in FIG. 12.

4) Modifying the parameter of the wireless device. A user clicks the right key of the mouse on a wireless device in the interface and selects "modifying parameter". A new dialog box will appear which includes a plurality of wireless device parameters including channel number, transmission speed and transmitting power and so on. The user may select one parameter to modify. The method of implementing this function is to modify the feature of the wireless device in the wireless device list. For example, the user requests to modify the transmitting power of the node 03 shown in FIG. 8 and modify transmitting power=10 (default) to transmitting power=5. The modification in the wireless device list is "03, node, battery=low, transmitting power=5".

The system and method for managing CWSN (Cloud Wireless Sensor Network) with GUI (graphical user interface) in accordance with the embodiments of the present disclosure establish a dynamic interface mainly in graphics, which makes the information of the sensor network clear and the user can easily know the operation condition, connection condition and the strength of the wireless signal in the sensor network and can also easily find the problematical wireless device in the network. The user can control the sensor network, establish the communication path, modify the communication path and set the parameters of the wireless device through the interface directly. The user does not need using relatively difficult operations such programming or examining or modifying text files and the datasheets. As the present disclosure decreases the difficulty of maintenance and monitor of the network, the user can directly control and maintain the network with less intervene of any professional team or outside company.

At last, it should be noted that those skilled in the art can make various amendments and modifications to the present disclosure without departing from the spirit and scope of the present disclosure. Thus, the present disclosure intends to include the amendments and modifications if the amendments and modifications fall into the scope of the claims of the present disclosure and its equivalent technology.

The system and method for managing CWSN with GUI in accordance with the present disclosure can not only dynamically manage the operation condition of the wireless sensor network, but also allow directly monitoring and maintaining the wireless sensor network through the interface and performing the operation of establishing and modifying the communication path and data collection and so on.

The invention claimed is:

1. A system for managing CWSN with GUI, wherein the system comprises:
one or more wireless sensor networks, each comprising at least one wireless device, wherein the wireless device comprises at least one base station, at least one node and/or at least one relay, and is configured to collect sensor data and transmit the sensor data and operation status of the wireless devices to one or more cloud servers, wherein the one or more cloud servers being configured to receive the sensor data and operation status from the base station, to process the sensor data and store the sensor data in a database, to manage the operation of the wireless device in the wireless sensor network and to store a wireless device list and a communication connection list representing the communication connection between each pair of father node and child node in the wireless sensor network, wherein the cloud server is configured to transmit the wireless device list and the communication connection list to a client and to forward data packages from the client to the wireless device; and one or more clients configured to display the wireless device list and the communication connection list with a dynamic graphic interface and to convert instructions into data of the wireless device list and the communication connection list and transmit the data to the cloud server;

wherein the dynamic graphic interface comprises a name of each wireless device in the wireless device list and a network topology of the wireless devices;

wherein a width or length or color of a connecting line in the network topology varies with RSSI of corresponding connection in the communication connection list.

2. The system for managing CWSN with GUI of claim 1, wherein the operation status comprises a status of the battery, a status of the communication, RSSI, and an operation status of the sensor.

3. The system for managing CWSN with GUI of claim 1, wherein the node and the relay both comprise:
a sensor module comprising a sensor device for collecting sensor data;
a RF communication module comprising a RF communication chip for wirelessly communicating with each other when adopting a same physical layer communication protocol; and
a signal processing module configured to control the sensor module by requesting or modifying an operation status thereof through a serial port, to request and receive the sensor data from the sensor module, to process the sensor data, and to control the RF communication module to receive or transmit a data package wirelessly and to request and modify an operation status of the RF communication module.

4. The system for managing CWSN with GUI of claim 3, wherein the node and the relay further comprise:
a memory for performing signal processing and computing;
a mass storage device for storing the sensor data and operating information including the communications protocol information; and
a power supply module comprising a battery and a battery power management chip and/or a DC power supply import and a DC power managing chip.

5. The system for managing CWSN with GUI of claim 4, wherein the base station comprises:
a base station sensor module comprising a sensor device for collecting the sensor data; an Ethernet communication module comprising an Ethernet communication chip and an Ethernet interface, for communicating with devices in Ethernet via Ethernet standard communication protocols; and
a base station signal processing module configured to control the base station sensor module by requesting or modifying an operation status thereof through a serial port, to request and receive the sensor data from the base station sensor module, to process the sensor data, and to control the Ethernet communication module to exchange data packages with the cloud server.

6. The system for managing CWSN with GUI of claim 5, wherein the base station further comprises:
a memory for performing signal processing and computing;
a mass storage device for storing the sensor data and operating information including communications protocol information; and
a power supply module comprising a battery and a battery power managing chip and/or a DC power supply import and a DC power managing chip.

7. A method for managing CWSN with GUI, comprising:
S100, collecting sensor data and packaging the sensor data and operation status of a node or relay into a data package and transmitting the same to a base station;
S200, the base station forwarding the data package received from the node or relay to a cloud server via Ethernet for further processing, wherein the cloud server is configured to store a wireless device list and a communication connection list representing the communication connection between each pair of father node and child node in the wireless sensor network, and to transmit the wireless device list and the communication connection list to a client; and
S300, the client displaying the wireless device list and the communication connection list in accordance with data packages obtained from the cloud server, and controlling and modifying an operation status of a wireless sensor network in accordance with instructions,
wherein the controlling and modifying the operation status of the wireless sensor network in accordance with the instructions further comprises:
S320, the client converting the instructions into data compatible with the wireless device list and/or the communication connection list and then transmitting the data to the cloud server;
S330, the cloud server parsing the received data, generating a data package in accordance with the data, and transmitting the data package to a related wireless device;
S340, after receiving an acknowledgment package from the wireless device, the cloud server updating the wireless device list and/or the communication connection list in accordance with the acknowledgement package, and transmitting updated information to the client, the client updating the wireless device list and/or communication connection list on the client with the updated information; and
S350, updating an interface graphics program with the updated information and thus updating an image display at the client.

8. The method for managing CWSN with GUI of claim 7, wherein the step S200 further comprises:
S210, the cloud server transmitting to the base station a data package including a communication path via the Ethernet when the cloud server needs to communicate a wireless device, and then the base station forwarding the data package.

9. The method for managing CWSN with GUI of claim 7, wherein the instruction is one or more of instructions for adding node, modifying a communication connection, removing a communication connection, deleting a wireless device and modifying the parameters of a wireless device.

10. The system for managing CWSN with GUI of claim 1, wherein each time receiving a data package transmitted from the base station, the cloud server updates the wireless device list and the communication connection list in accordance with the data package.

11. The system for managing CWSN with GUI of claim 10, wherein the client is configured to marks "x" on a corresponding wireless device to indicate that the communication path of the child node is closed if RSSI is too low for a reliable communication, and to display characteristics of the wireless device in the wireless device list beside a corresponding icon of the wireless device.

\* \* \* \* \*